(12) United States Patent
Huettlin

(10) Patent No.: US 7,909,014 B2
(45) Date of Patent: Mar. 22, 2011

(54) OSCILLATING PISTON MACHINE

(76) Inventor: Herbert Huettlin, Steinen (DE)

( * ) Notice: Subject to any disclaimer, the term of this patent is extended or adjusted under 35 U.S.C. 154(b) by 140 days.

(21) Appl. No.: 12/196,558

(22) Filed: Aug. 22, 2008

(65) Prior Publication Data

US 2009/0031979 A1    Feb. 5, 2009

Related U.S. Application Data

(63) Continuation of application No. PCT/EP2007/001512, filed on Feb. 22, 2007.

(30) Foreign Application Priority Data

Feb. 22, 2006    (DE) .......................... 10 2006 009 197

(51) Int. Cl.
| | |
|---|---|
| *F02B 33/44* | (2006.01) |
| *F01C 3/06* | (2006.01) |
| *F01C 1/00* | (2006.01) |
| *F01C 9/00* | (2006.01) |
| *F04C 18/00* | (2006.01) |
| *F04C 2/00* | (2006.01) |

(52) U.S. Cl. .......... 123/241; 123/245; 123/18 R; 418/35
(58) Field of Classification Search ................... 123/241, 123/245, 18 R, 18 A, 43 B; 418/34–38, 68; F01C 3/06, 9/00, 3/00, 21/08, 21/00; F03C 2/00, F03C 4/00; F02B 33/44
See application file for complete search history.

(56) References Cited

U.S. PATENT DOCUMENTS

| | | |
|---|---|---|
| 3,075,506 A | 1/1963 | Berry .......................... 123/43 B |
| 4,215,548 A | 8/1980 | Beremand |
| 5,603,245 A | 2/1997 | Walczak et al. |
| 5,943,915 A | 8/1999 | Kato |
| 7,435,064 B2 * | 10/2008 | Huttlin ............................ 418/35 |

(Continued)

FOREIGN PATENT DOCUMENTS

DE    10361566 B4    9/2006

(Continued)

OTHER PUBLICATIONS

International Search Report, Jun. 13, 2007 (3 pages).

(Continued)

*Primary Examiner* — Thai Ba Trieu
(74) *Attorney, Agent, or Firm* — St. Onge Steward Johnston & Reens LLC

(57) ABSTRACT

An oscillating piston engine comprises a housing in which at least one piston is arranged which can revolve in the housing about an axis of rotation which is fixed in relation to the housing, and which performs when revolving about the axis of rotation reciprocating pivoting movements about pivot axis extending perpendicularly to the axis of rotation between a first end position and a second end position, the at least one piston having a running element which runs, as the piston revolves about the axis of rotation, along at least one control cam which is configured in such a way that the pivoting movements of the at least one piston are derived from the revolving movement of the running element along the control cam. A second running element mounted to the piston and/or a negative-pressure source applying a negative pressure to the backside of the piston are provided for assisting the return of the piston from the first end position to the second end position of the pivoting movement of the piston.

8 Claims, 10 Drawing Sheets

U.S. PATENT DOCUMENTS

| | | |
|---|---|---|
| 7,469,673 B2 * | 12/2008 | Wagner .......... 123/241 |
| 7,563,086 B2 * | 7/2009 | Huttlin .......... 123/241 |
| 2005/0008515 A1 | 1/2005 | Huttlin |
| 2005/0135950 A1 | 6/2005 | Huettlin |
| 2007/0209632 A1 | 9/2007 | Wagner .......... 123/241 |
| 2009/0038581 A1 * | 2/2009 | Huettlin .......... 123/245 |

FOREIGN PATENT DOCUMENTS

| | | |
|---|---|---|
| DE | 102005038447 B3 * | 1/2007 |
| JP | 55091740 A | 7/1980 |
| JP | 7054952 A | 2/1995 |
| JP | 10142362 A | 5/1998 |
| WO | 03067033 A1 | 8/2003 |
| WO | 2005098202 A1 | 10/2005 |

OTHER PUBLICATIONS

International Preliminary Report on Patentability, PCT/EP2007/001512, Oct. 23, 2008, 7 pages.

Japanese Office Action; Application No. 2008-555696; Dec. 2, 2010; 3 pages.

* cited by examiner

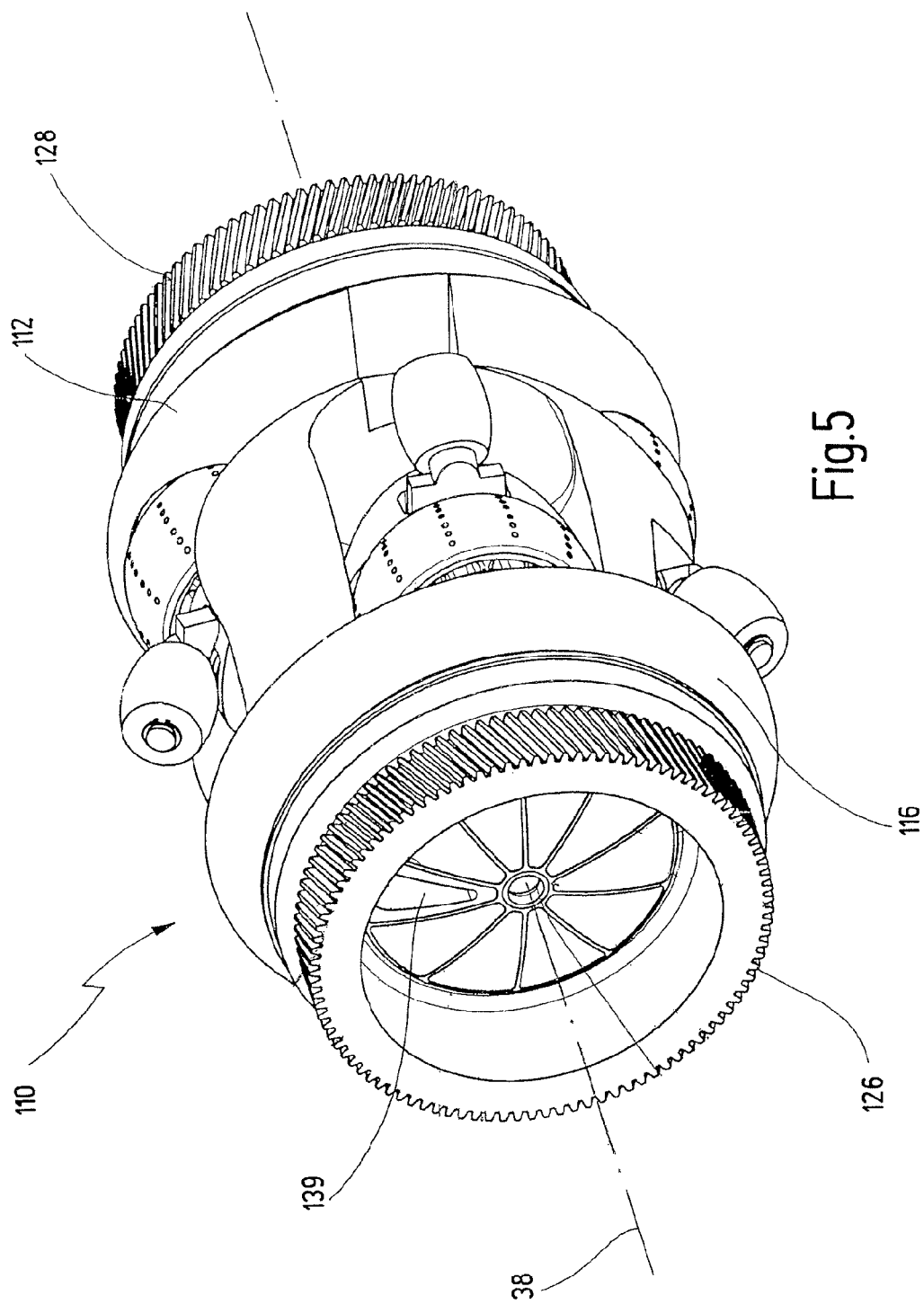

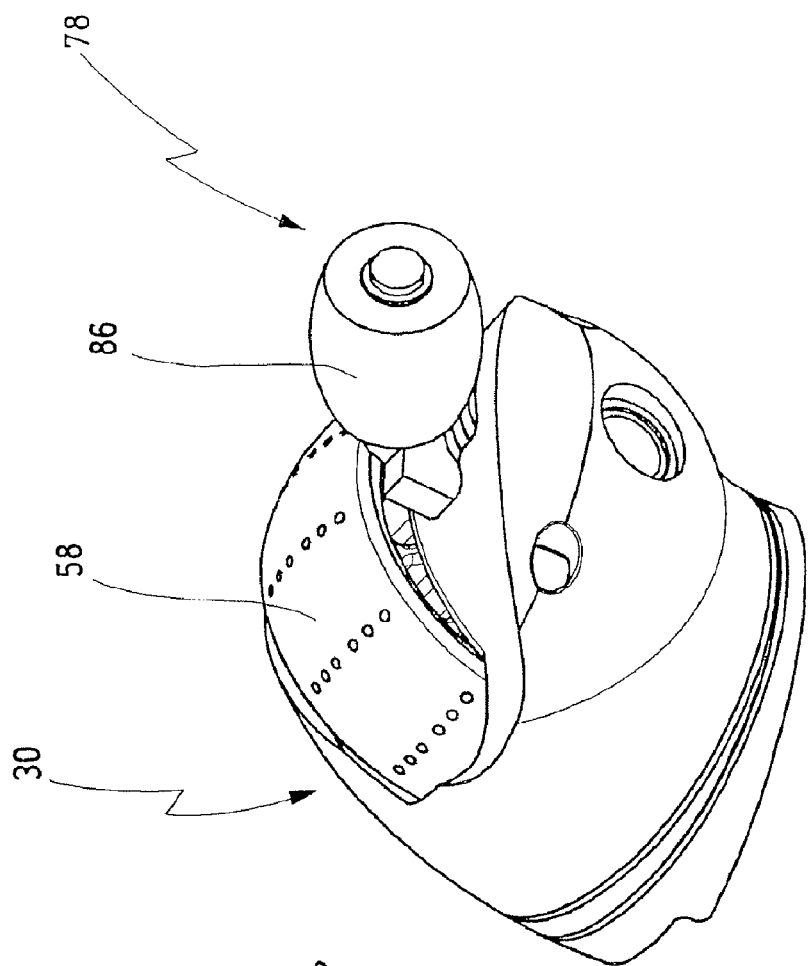
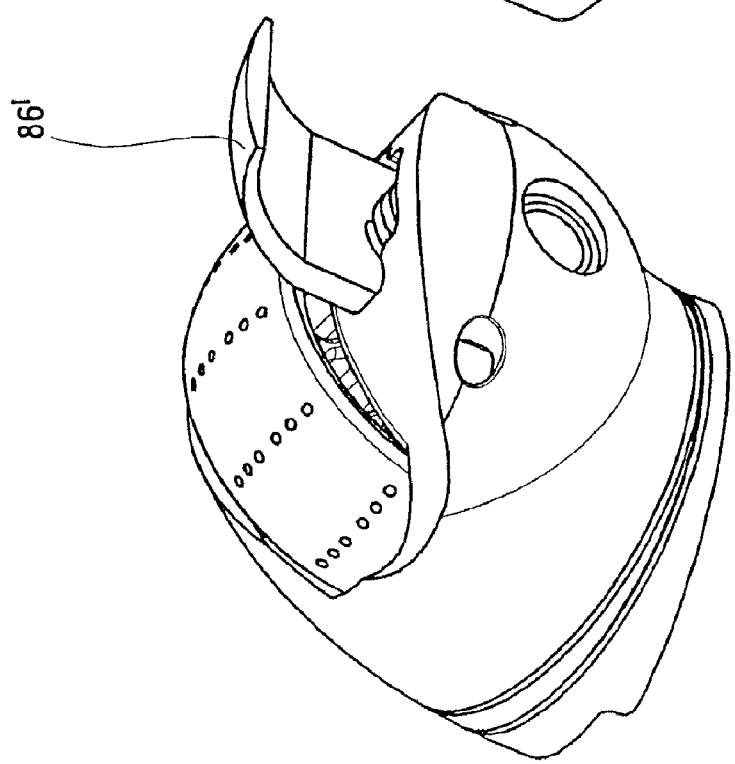
Fig.6b
Fig.6a

OSCILLATING PISTON MACHINE

CROSS-REFERENCE TO RELATED APPLICATIONS

The present application is a continuation of pending international patent application PCT/EP2007/001512 filed on Feb. 22, 2007 which designates the United States, and which claims priority of German patent application No. 10 2006 009 197.3 filed on Feb. 22, 2006.

BACKGROUND OF THE INVENTION

The invention generally relates to oscillating piston engines. More specifically, the invention relates to an oscillating piston engine of the type comprising a housing in which at least one piston is arranged which can revolve in the housing about an axis of rotation which is fixed in relation to the housing, and which performs when revolving about the axis of rotation reciprocating pivoting movements about a pivot axis extending perpendicularly to the axis of rotation between a first end position and a second end position, the at least one piston having a first running element which runs, as the piston revolves about the axis of rotation, along at least one control cam which is configured in such a way that the pivoting movements of the at least one piston are derived from the revolving movement of the running element along the control cam.

Oscillating piston engines and in particular an oscillating piston engine according to the present invention can be used as internal combustion engines, as pumps or as compressors. An oscillating piston engine according to the present invention is preferably used as an internal combustion engine and is described as such in the present description.

In the case of the use of an oscillating piston engine as an internal combustion engine, the individual working strokes of admitting, compressing, expanding and expelling are imparted by reciprocating pivoting movements of the at least one piston between two end positions.

In the case of the oscillating piston engine known from document WO 03/0670333 A1 from the same Applicant, a total of four pistons are arranged in the spherical housing which jointly revolve about an axis of rotation which is central to the housing and fixed in relation to the housing and perform when revolving in the housing reciprocating pivoting movements about a pivot axis, each two adjacent pistons pivoting in opposite directions. In the case of this known oscillating piston engine, each two pistons diametrically opposing the center of the housing are rigidly connected to each other to form a double piston, and two such pairs of pistons are arranged crosswise in the center of the housing. A respective working chamber is formed between each two mutually facing end surfaces of the pistons of the pairs of pistons, so that the known oscillating piston engine has a total of two working chambers. Both working chambers, which are arranged diametrically opposing the center of the housing, increase and decrease in size in the same direction during the reciprocating pivoting movement of the pistons.

The pivoting movements of the at least one piston are delimited by a first end position and a second end position. The first end position, in which the working chamber has a minimum volume, is referred to as the TDC (top dead center) position and the second end position, in which the working chamber has a maximum volume, as the BDC (bottom dead center) position.

In order to derive the pivoting movements of the at least one piston from its revolving movement about the axis of rotation, the at least one piston has a running element which runs along a control cam formed in the inner wall of the housing itself or on a cam piece connected to the housing inner wall. The control cam extends around the axis of rotation and is configured to be curved in accordance with the reciprocating pivoting movements to be brought about, i.e. has regions which are set further apart from the axis of rotation and regions which are set less far apart from the axis of rotation.

Especially in the case of a configuration of an oscillating piston engine of this type in which in the TDC position the at least one piston is located in proximity to the axis of rotation, while in the BDC position it is set further apart from the axis of rotation, the centrifugal force resulting from the revolving movement of the at least one piston about the axis of rotation assists the movement of the piston from the TDC position to the BDC position. At low rotational speeds, in particular during start-up of the oscillating piston engine, these centrifugal forces are however low. A second oscillating piston is present in the housing on the opposing side of the pivot axis, which second piston is in the process of performing the expanding working stroke after ignition of a fuel/air mixture, while the at least one first piston is in the process of performing the drawing-in working stroke, it can occur that the pressure bank which builds up as a result of the expanding working stroke brakes the pivoting movement of the first piston from the TDC position to the BDC position, thus preventing the first piston from reaching the BDC position in due time with direct and secure contact of its running element on the control cam.

However, also at high rotational speeds, at which there is a sufficient centrifugal force to assist the pivoting movement of the at least one piston from the TDC position to the BDC position, the centrifugal forces in the TDC position are still small, and the risk cannot be ruled out that the running element of the at least one piston does not run along the control cam with the required precision, but rather loses its contact with the control cam, as a result of which the pivoting movement of the at least one piston can be inconstant. This means that the pivoting movement of the at least one piston can at certain points be interrupted or at least slowed down, while in other regions it is then sped up. This can even give rise to the undesired scenario that the at least one piston reaches its BDC position late or not at all. This impairs the running properties, in particular the smoothness of running of an oscillating piston engine of this type.

SUMMARY OF THE INVENTION

The invention is therefore based on the object of developing an oscillating piston engine of the type mentioned at the outset so as to improve the running properties.

According to a first aspect of the invention, an oscillating piston engine is provided, comprising
  a housing,
  a first piston arranged in the housing, the first piston being able to revolve in the housing about an axis of rotation which is fixed in relation to the housing, and to perform when revolving about said axis of rotation reciprocating pivoting movements about a pivot axis extending perpendicularly to said axis of rotation between a first end position and a second end position,
  a first running element mounted to the first piston,
  a first control cam arranged in the housing, the first running element running, as the first piston revolves about the axis or rotation, along the first control cam, the first control cam being configured such that the pivoting movements of the first piston are derived when the first running element runs along the first control cam, a second running element mounted to the first piston, and a second control cam arranged laterally adjacent to the first control cam in direction of the rotation axis, the second running element running along the second control cam when the first piston revolves about the axis of rotation, the second running element assisting the return of the first piston at least from the first end position to the second end position.

The oscillating piston engine according to the invention therefore has for the at least one piston, in addition to the running element which runs along the control cam, return means for assisting the return of the at least one piston at least from the first end position to the second end position. Obviously, the return means provided can also assist the return of the at least one piston from the second end position to the first end position. The configuration according to the invention is advantageous especially when the at least one piston is located closer to the axis of rotation in the first end position than in the second end position. In this case, the pivoting movement of the at least one piston from the first end position to the second end position is assisted by centrifugal forces, although, as described hereinbefore, these centrifugal forces may at low rotational speeds and in particular in the TDC position be insufficient in order securely to guide the at least one piston from the first end position to the second end position. The return means provided in accordance with the invention are configured in such a way that the running element of the at least one piston is kept in contact with the control cam throughout the swiveling movement from the first to the second end position. As a result of the provision of the return means according to the invention for assisting the return of the at least one piston at least from the first end position to the second end position, the running properties of the oscillating piston engine according to the invention, in particular its smoothness of running, are improved.

In this embodiment, the return means have a second running element which is connected to the at least one piston and which runs along a second control cam laterally adjacent to the control cam when the at least one piston revolves about the axis of rotation.

In this embodiment, the at least one piston accordingly has, in addition to the running element which runs along the first control cam, a second running element which runs along a separate control cam which is adjacent to the first control cam. The first running element can thus be positioned on the at least one piston in such a way that it predominantly absorbs the radial compressive forces to support the piston on the side of the housing, while the second running element critically has the function of guiding the at least one piston securely at least from the first end position to the second end position.

In connection with the aforementioned configuration, it is furthermore preferred if the second control cam is configured in such a way that the second running element, which runs along the second control cam, exerts a tensile force on the at least one piston in the direction toward the second end position.

This measure is advantageous especially when the first end position is located closer to the axis of rotation than the second end position of the at least one piston. In this case, the second running element, which runs along the second control cam, causes the piston to be acted on, from the first end position to the second end position, with a tensile force which ensures secure guidance of the swiveling movement of the at least one piston from the first end position to the second end position.

In further preferred configurations, the second running element is a running roller or a sliding shoe.

The provision of a running roller as the second running element has the advantage of reduced-friction guidance of the second running element on the second control cam, while a sliding shoe, which slides along the second control cam, is a constructionally simpler design of the second running element.

In a further preferred configuration, the second running element is resiliently mounted on the piston.

Compared to a rigid connection of the second running element to the at least one piston, the resilient mounting of the second running element on the at least one piston has the advantage that the second running element is at least somewhat flexibly movable relative to the first running element, thus allowing for example production-related tolerances in the production of the two control cams in the housing or on a cam piece to be compensated for by the resilient play. This ensures a smooth pivoting movement of the at least one piston, thus further improving the running properties and in particular the smoothness of running of the oscillating piston engine.

In a further preferred configuration, the first control cam and the second control cam are configured as cam grooves which extend substantially parallel to each other and are separated from each other by a web, the first running element and the second running element being guided on flanks of the cam grooves that are curved in opposite directions to each other.

Preferably, the first running element runs in this case on the flank of the first cam groove that is curved facing the at least one piston and the second running element on the flank of the second cam groove that is curved in the opposite direction, facing away from the piston. This enables the second running element to apply a sufficient tensile force to withdraw the at least one piston from the first end position to the second end position.

In a further preferred configuration, at least a second piston is arranged in the housing which can revolve together with the at least one piston about the axis of rotation and which can pivot about a pivot axis which does not run parallel to the pivot axis of the at least one piston, the at least one second piston having a first running element which runs along the second control cam of the at least one piston and a second running element which runs, to assist the return of the at least one second piston, at least from a first end position to a second end position along the first control cam of the at least one piston.

In the case of this configuration of the oscillating piston engine according to the invention, the oscillating piston engine has two working chambers, the advantage of the aforementioned measure consisting in the fact that the guidance of the at least two pistons requires overall just two control cams which at the same time form a part of the respective return means for assisting the return of the pistons from the first end position to the second end position. Obviously, the oscillating piston engine according to the invention can also have four pistons, two of which form a pair of pistons delimiting between them a working chamber. The pivot axes of the at least one and at least second piston do not extend parallel to each other but rather are offset from one another by an angle, preferably by 90°.

According to another aspect of the invention, an oscillating piston engine is provided, comprising a housing, a first piston arranged in the housing, the first piston being able to revolve in the housing about an axis of rotation which is fixed in relation to the housing, and to perform when revolving about the axis of rotation reciprocating pivoting movements about a pivot axis extending perpendicularly to the axis of rotation between a first end position and a second end position, a running element mounted to the first piston, a control cam arranged in the housing, the running element running, as the first piston revolves about the axis or rotation, along the control cam, the control cam being configured such that the pivoting movements of the first piston are derived when the running element runs along the control cam, and a negative-pressure source for generating a negative pressure applied to a back of the first piston in order to assist the return of the first piston at least from the first end position to the second end position.

In this embodiment, a second running element may be dispensed with, as a result of which the piston back of the at least one piston does not have to be increased in size, as a result of which the pivoting stroke can overall be larger than if an additional second running element is arranged on the back of the piston. A negative pressure of this type is specifically selected in such a way that the pivoting movement of the at least one piston from the second end position to the first end position is not restricted. A negative pressure in the range of from 1,000-2,000 kp/m² is sufficient for the purposes of assisting the return of the at least one piston from the first end position to the second end position.

In a further preferred configuration, the first running element is configured as a roller, below the running surface of which ventilation blades are arranged.

This measure has the advantage that the first running element not only guides the at least one piston along the control cam, but rather also serves at the same time as a fan for cooling the at least one piston. As the roller runs along the control cam, air is drawn into the back of the piston by the ventilation blades and blown out again via a corresponding spacing between the roller and the piston. In this way, cooling air, which can be supplied to the oscillating piston engine for example via a closed air cooling circuit, is introduced into the at least one piston.

Further advantages and features will emerge from the following description and the appended drawings.

It will be understood that the features which have been mentioned hereinbefore and will be further described hereinafter can be used not only in the respectively specified combination, but rather also in other combinations or in isolation, without departing from the scope of the present invention.

BRIEF DESCRIPTION OF THE DRAWINGS

Exemplary embodiments of the invention are illustrated in the drawings and will be described hereinafter in greater detail with reference to said drawings, in which:

FIG. 5 is a perspective view of a piston cage of the oscillating piston engine in FIG. 1 to 4 including pistons received therein;

FIGS. 6a and b) show two variations of a piston of the oscillating piston engine in FIG. 1 to 4;

DETAILED DESCRIPTION OF PREFERRED EXEMPLARY EMBODIMENTS

Figure 1:
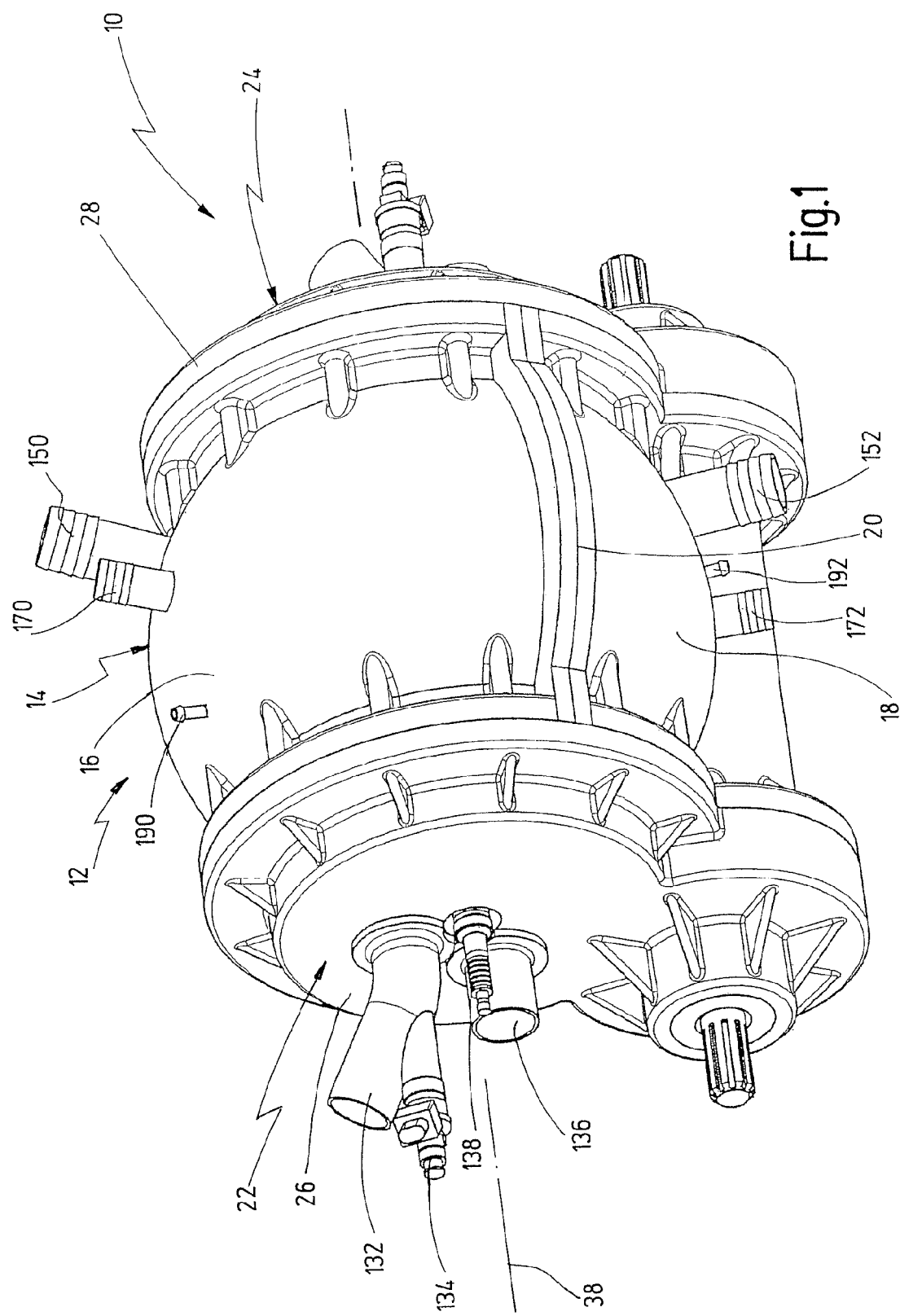
FIG. 1 is a perspective overall view of an oscillating piston engine.

FIG. 1 to 4 show an oscillating piston engine provided with general reference numeral 10. Further details of the oscillating piston engine 10 are shown in FIG. 5 to 10.

The oscillating piston engine 10 is generally designed as an internal combustion engine but, modified accordingly, can also be used as a pump or as a compressor.

The oscillating piston engine 10 has a housing 12 which in FIG. 1 is shown closed. The housing 12 has a central housing portion 14 which is spherical in its formation. The central housing portion 14 is composed of two housing halves 16 and 18 which are joined together via a flange 20.

The housing 12 also has a first end face 22 and a second end face 24 opposing the first end face 22.

The first end face 22 is formed by an end-face housing lid 26 and the second end face 24 by an end-face housing lid 28. The housing lids 26 and 28 are connected to the central housing portion 14 or the housing halves 16 and 18 thereof. The housing lids 26 and 28 can be detached from the central housing portion 14, just as the housing half 16 can be detached from the housing half 18.

Figure 2:
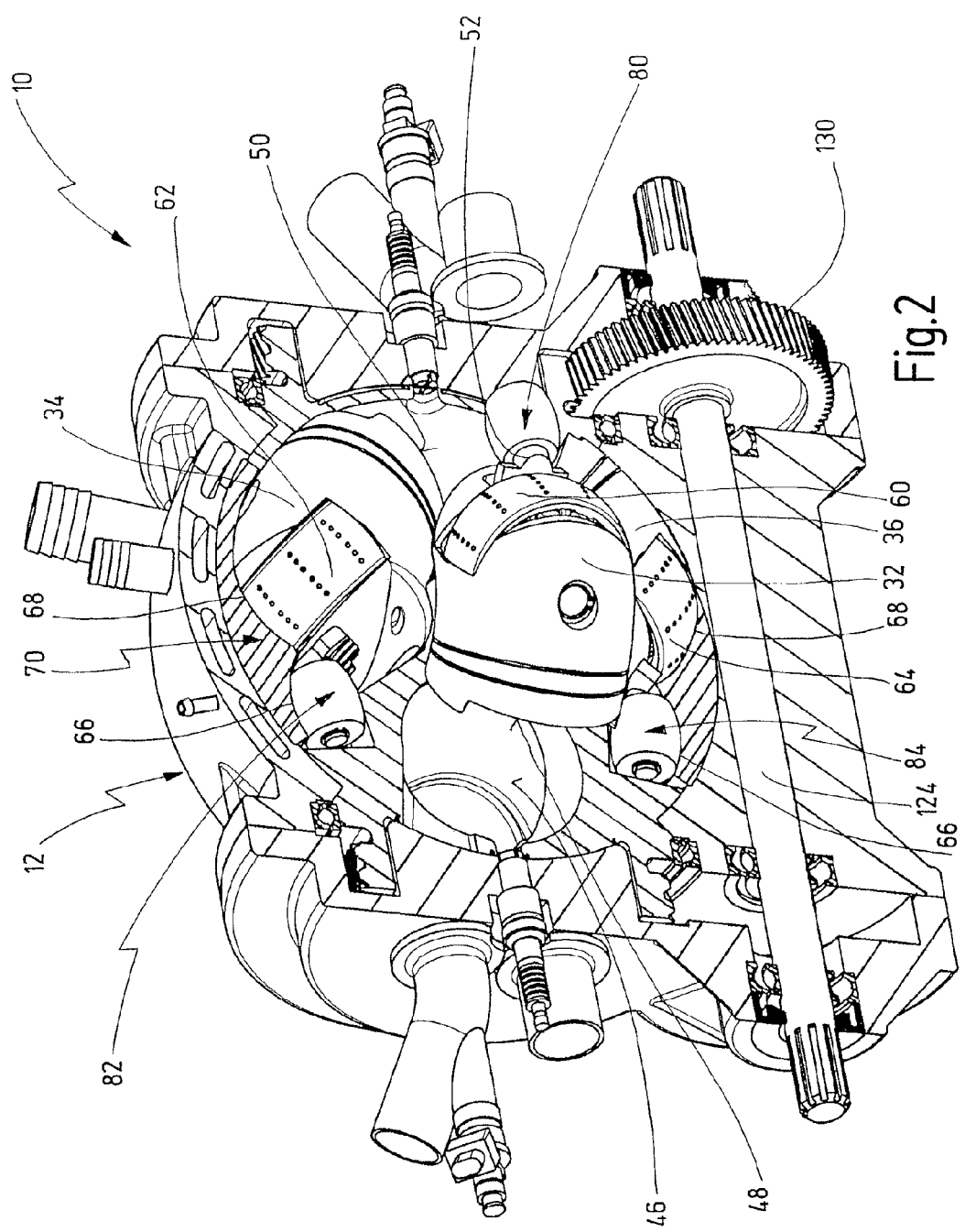
FIG. 2 is a longitudinal section of the oscillating piston engine in FIG. 1, the pistons being shown in a first pivoting end position (BDC position)
Figure 3:
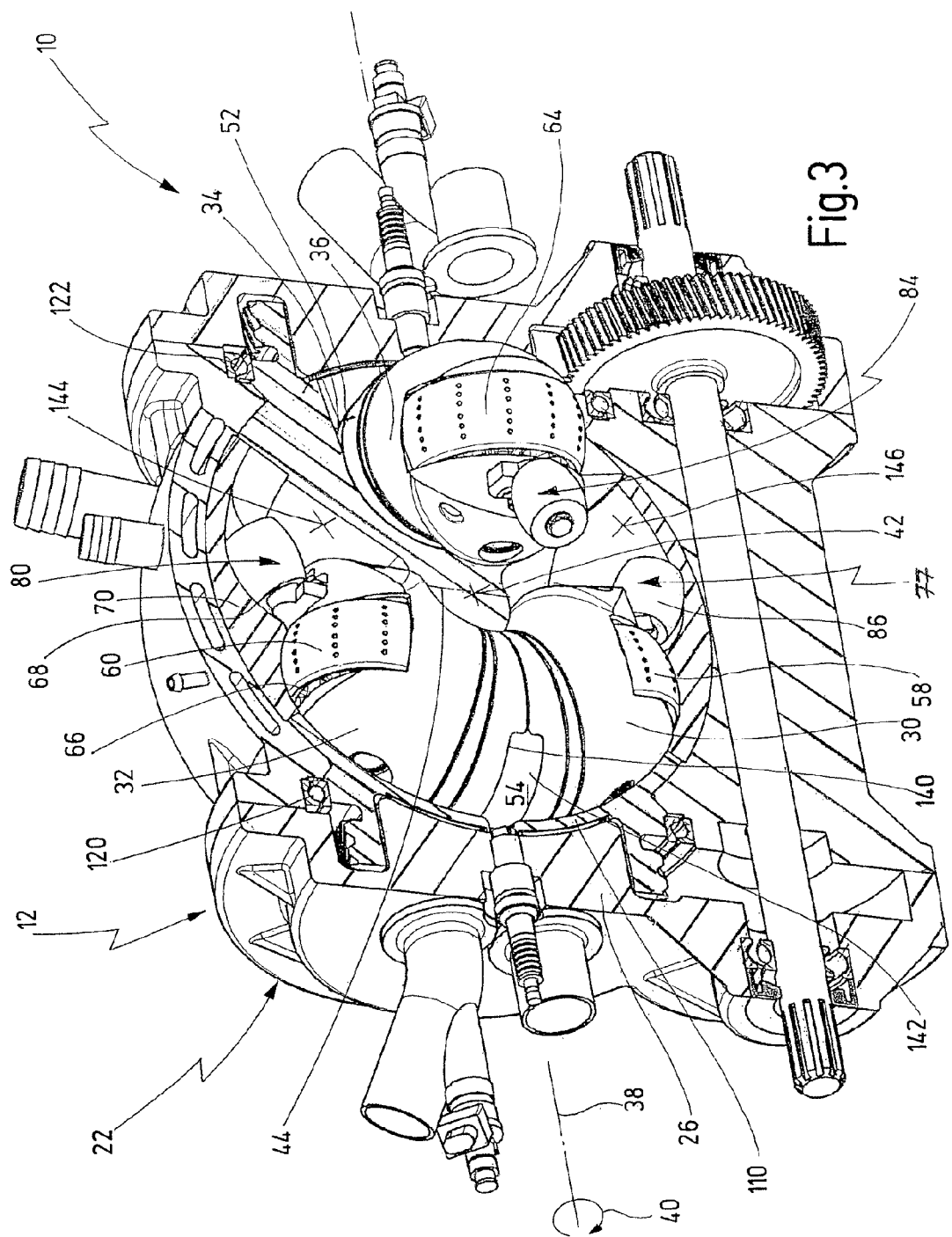
FIG. 3 shows the oscillating piston engine in FIG. 1 in the same section as in FIG. 2, the pistons now being shown in a second pivoting end position (TDC position)
Figure 4:
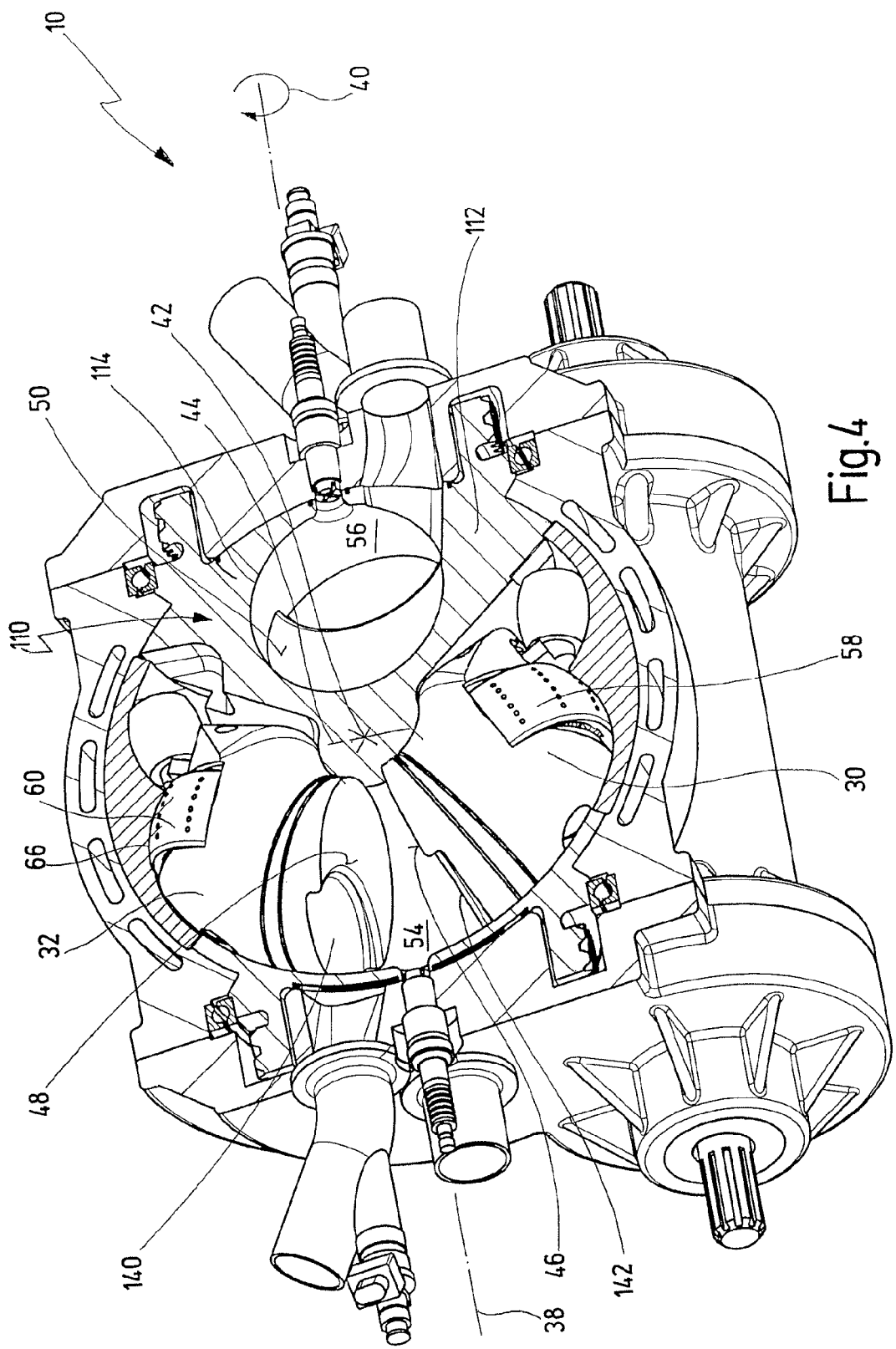
FIG. 4 is a further longitudinal section of the oscillating piston engine in FIG. 1, the sectional plane in FIG. 4 being tilted through approximately 45° in relation to the sectional plane in FIGS. 2 and 3, and the pistons being shown in a pivoting position located approximately centrally between the pivoting end positions in FIG. 2 and in FIG. 3.

According to FIGS. 2 to 4, four pistons 30, 32, 34, 36 are arranged inside the housing 12. The pistons 30 to 36 can revolve in the housing 12 jointly about an axis of rotation 38 in the direction indicated by an arrow 40. The axis of rotation 38 passes through the center of the spherical interior of the housing 12 and is fixed in relation to the housing, i.e. does not change its position relative to the housing 12 as the pistons 30, 32, 34, 36 revolve.

The pistons 30, 32, 34, 36 perform as they revolve about the axis of rotation 38 a pivoting movement which is superimposed on the revolving movement. The pistons 30 and 32 perform in this case reciprocating pivoting movements about a first pivot axis 42 which perpendicularly intersects the axis of rotation 38 at the center of the interior of the housing 12, while the pistons 34 and 36 perform as they revolve about the axis of rotation 38 reciprocating pivoting movements about a second pivot axis 44 which perpendicularly intersects the axis of rotation 38 likewise at the center of the interior of the housing 12, but is also located perpendicularly to the pivot axis 42. The pivot axes 42 and 44 revolve with the pistons 30, 32, 34, 36 likewise about the axis of rotation 38. The instantaneous pivot plane of the pistons 30 and 32 is in this case located at all times perpendicularly to the instantaneous pivot plane of the pistons 34 and 36.

It is however also possible for all four pistons 30, 32, 34, 36 to be arranged in a common plane and the pivot axes 42 and 44 to be parallel or coincide.

Both the axis of rotation 38 and the pivot axes 42 and 44 are in this case to be understood as geometric axes.

The pivoting movements of the pistons 30 and 32 or 34 and 36 are carried out between two end positions, one end position being shown in FIG. 2 (what is known as the BDC position) and the other end position in FIG. 3 (what is known as the TDC position).

The pivoting movements of the pistons 30 and 32, on the one hand, and the pistons 34 and 36, on the other hand, are in all cases in the same direction, i.e. when the pistons 30 and 32 pivot apart from each other, the pistons 34 and 36 also pivot apart from each other, and vice versa.

Each of the pistons has an end surface, i.e. the piston 30 has an end surface 46, the piston 32 an end surface 48, the piston 34 an end surface 50 and the piston 36 an end surface 52, the view onto said end surface 5Z being obscured in FIG. 2 by another component.

The pistons 30 and 32 form a first pair of pistons, the end surfaces 46 and 48 of which face each other. The end surfaces 46 and 48 define a first working chamber 54. The pistons 34 and 36 form a second pair of pistons, the end surfaces 50 and 52 of which face each other and define a second working chamber 56. The volumes of the working chambers 54 and 56 increase and decrease in size in accordance with the reciprocating pivoting movements of the pistons 30 and 32 or 34 and 36, the working chambers 54 and 56 increasing or decreasing in size in all cases in the same direction.

The pistons 30, 32, 34, 36 are arranged in the housing 12 in such a way that the axis of rotation 38 passes through both working chambers 54 and 56, preferably centrally in each revolving and pivoting position of the pistons 30, 32, 34, 36.

In order to generate the pivoting movements of the pistons 30, 32, 34, 36 during the revolving movement thereof about the axis of rotation 38, each piston has a running element: the piston 30 a running element 58 (FIGS. 3 and 4), the piston 32 a running element 60 (cf. FIGS. 2 to 4), the piston 34 a running element 62 (cf. FIG. 2) and the piston 36 a running element 64 (cf. FIGS. 3 and 4). The running elements 58, 60, 62 and 64 are in this case formed as rollers, each running element 58, 60, 62 and 64 being rotatably fastened to the associated piston 30, 32, 34, 36.

A first control cam 66 is associated with the running elements 58 and 60 of the pistons 30 and 32 and a second control cam 68 is associated with the running elements 62 and 64 of the pistons 34 and 36.

The running elements 58 and 60 accordingly run along the same control cam 66, and the running elements 62 and 64 along the same control cam 68.

Figure 8:
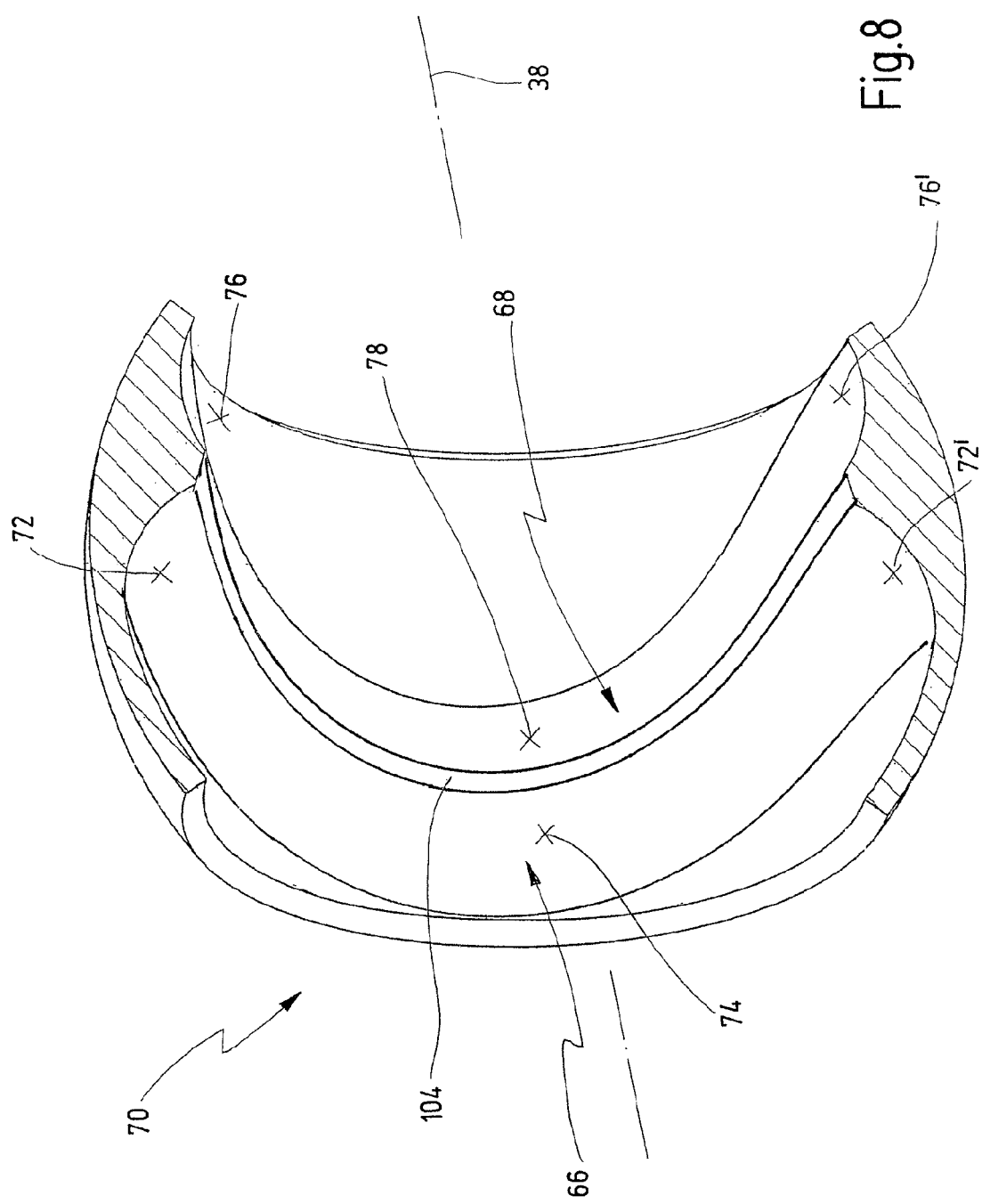
FIG. 8 is a perspective half longitudinal section through a cam piece of the oscillating piston engine in FIG. 1 to 4.
Figure 9:
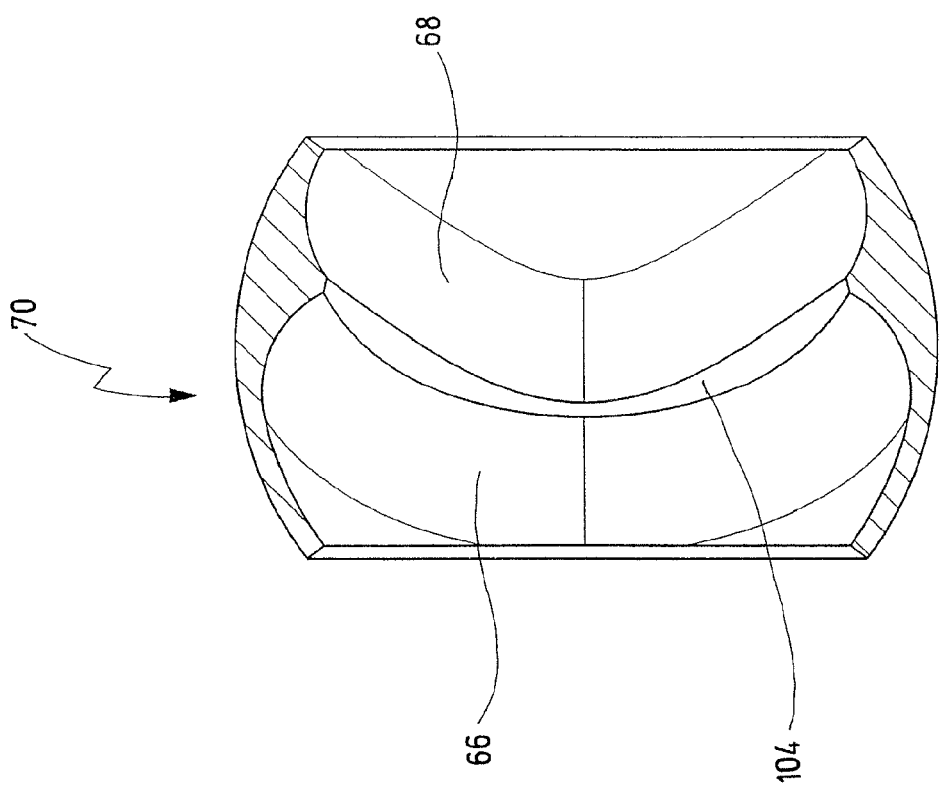
FIG. 9 is a further half longitudinal section of the cam piece in FIG. 8 in a different perspective from and on a smaller scale than FIG. 8.

The control cams 66 and 68 are formed on a cam piece 70 which is shown in a longitudinal central section in isolation in FIGS. 8 and 9. FIGS. 8 and 9 thus show only one half of the control cams 66 and 68 which obviously extend over a full circumference about the axis of rotation 38. The cam piece 70 is fastened inside the housing 12.

The control cams 66 and 68 each have a contour or cam guide allowing the pivoting movement of the pistons 30 and 32 or 34 and 36 to be derived from the revolving movement thereof about the axis of rotation 38.

The control cams 66 and 68 are formed laterally adjacent to each other and extend substantially parallel to each other.

The sectional plane of FIGS. 8 and 9 is perpendicular to the sectional plane of FIGS. 2 and 3 which also show the cam piece 70. In the view according to FIG. 8, points of the control cam 66 that are provided with reference numerals 72 and 72' correspond to the BDC position of the pistons 30 and 32, i.e. of the left-hand pair of pistons in FIGS. 2 and 3.

A point denoted by reference numeral 74 and a point (not shown in FIG. 8) which is offset with respect to the point 74 by 180° about the axis of rotation 38 correspond to the TDC position of the pistons 30 and 32, i.e. of the left-hand pair of pistons in FIG. 3.

Points of the control cam 68 that are provided with reference numerals 76 and 76' accordingly represent the TDC position of the pistons 34 and 36, i.e. of the right-hand pair of pistons in FIG. 3. As mentioned hereinbefore, the pistons 34 and 36 are offset relative to the pistons 30 and 32 by 90° about the axis of rotation 38. A point provided with reference numeral 78 and a point (not shown in FIG. 8) which is offset with respect to the axis of rotation 38 by 180° represent the BDC position of the pistons 34 and 36, which is shown in FIG. 2.

In addition to the running elements 58, 60, 62 and 64, return means 78, 80, 82 and 84 are associated with the pistons 30, 32, 34, 36, i.e. associated with the piston 30 are return means 78, with the piston 32 return means 80, with the piston 34 return means 82 and with the piston 36 return means 84. The return means 78, 80, 82 and 84 serve to assist the return of the pistons 30, 32, 34, 36 from the TDC position according to FIG. 3 to the BDC position according to FIG. 2.

As the return means 78, 80, 82 and 84 for the pistons 30, 32, 34, 36 are each identical, only the return means 78 of the piston 30 will be described in the present document by way of example, wherein this description equally applies to the remaining return means 80 to 84 of the pistons 30, 32, 34, 36.

According to FIG. 6b), the return means 78 for the piston 30 have a second running element 86 which is provided on the piston 30, in addition to the first running element 58, and connected to the piston 30. The running element 86 is in the form of a running roller. Alternatively, it can also be formed as a sphere.

Figure 7:
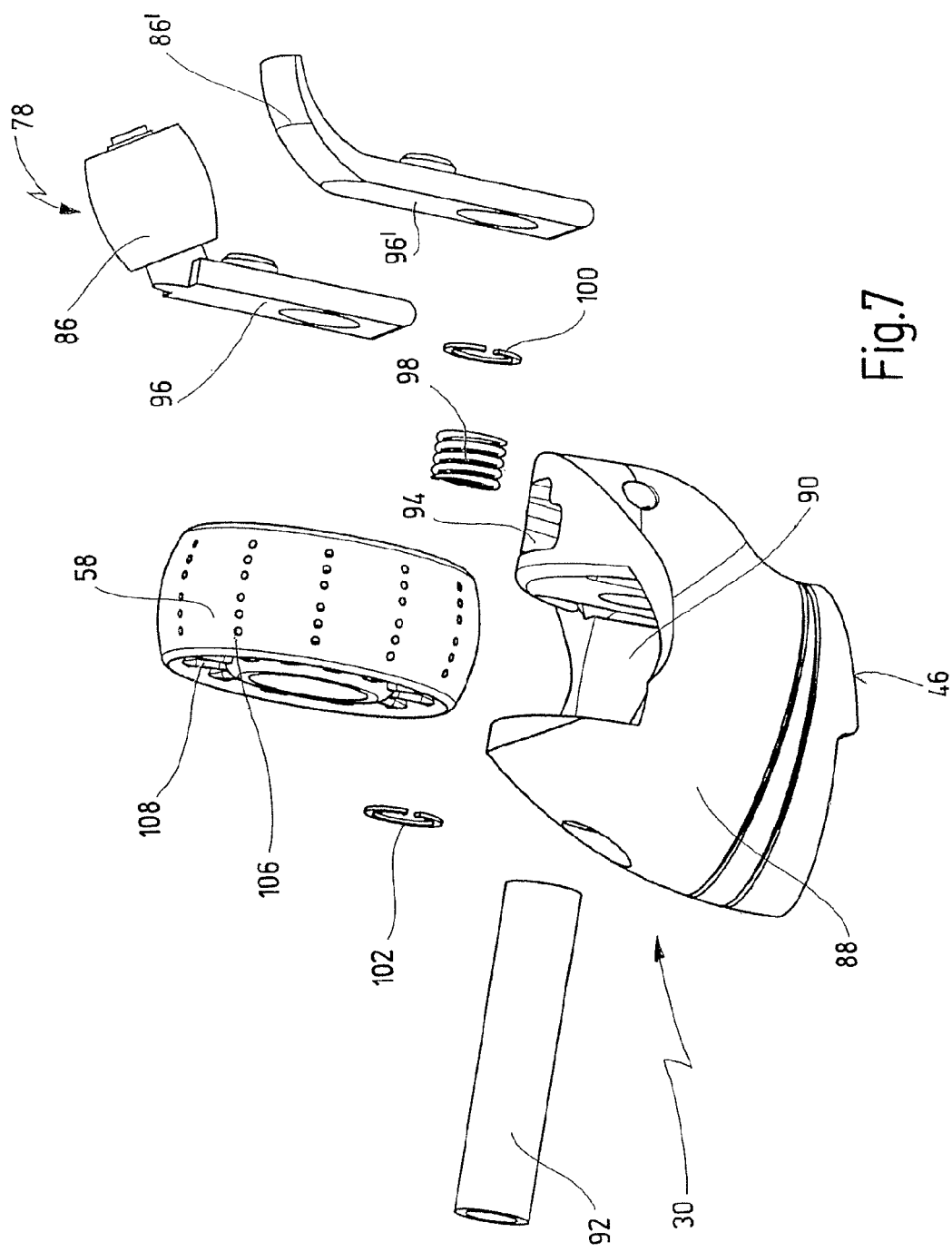
FIG. 7 is an exploded view of the variations of the pistons in FIG. 6a) and b)

According to FIG. 7, the piston 30 has a piston body 88 having a recess 90 in which the running element 58, which is formed as a running roller, is rotatably received via a journal 92. The recess 90 is located on the back of the piston 30, i.e. that side which is remote from the end surface 46 of the piston 30. The running element 58 can also be formed as a sphere.

Formed on the back of the piston 30, adjacent to the recess 90, is a further recess 94 which serves to receive the second running element 86. The second running element 86 of the return means 78 is fastened to a lug 96 which dips into the recess 94 and also sits on the journal 92, although the lug 96 is not rotatable about the journal 92. The second running element 86 is resiliently mounted on the piston 30, via a spring 98 which in this case is formed as a coil spring. The second running element 86 is as a result slightly movable relative to the first running element 58, in the direction of the spacing of the second running element 86 from the first running element 58, i.e. toward the first running element 58 and away therefrom.

Two securing rings 100 and 102 secure the journal 92 in the piston body 88 of the piston 30.

According to FIG. 3, the second running element 86 of the return means 78 of the piston 30 runs in the second control cam 68 in which the first running elements 62 and 64 of the pistons 34 and 36 also run. Owing to the offset of the pivot plane of the pistons 34 and 36 from the pivot plane of the pistons 30 and 32, the second running element 86 of the piston 30 and the first running elements 62 and 64 of the pistons 34 and 36 are not disturbed in this case. The return means 80 of the piston 32 also run in the second control cam 68 and, conversely, the return means 82 and 84 for the pistons 34 and 36, which are also provided on the pistons 34 and 36 as the second running element, run in the first control cam 66 in which the first running elements 58 and 60 of the pistons 30 and 32 run.

Owing to this arrangement, all that are required are still the two control cams 66 and 68 which would equally be required if the pistons 30 and 36 were formed without the return means 78, 80, 82 and 84.

Starting from the TDC position in FIG. 3, the return means 78 and 80 of the pistons 30 and 32, which run in the second control cam 68, exert on the pistons 30 and 32 a tensile force in the direction of the BDC position. This is brought about inter alia as a result of the fact that the control cams 66 and 68 are formed as curve grooves which extend substantially parallel to each other and are separated from each other by a web 104, the first running elements 58 and 60 and the return means 78 and 80 being guided on the flanks of the cam grooves that are curved in opposite directions to each other, as may be seen from FIG. 3 and from FIG. 2.

As an alternative to the configuration of the return means 78, 80, 82 and 84, said return means can have, instead of a running roller 86, also a sliding block 86' formed by a ball-shaped surface at the free end of the lug 96' (FIGS. 6a and 7). The remaining design of the piston 30 and of the first running element 58 remains in this case unaltered.

As is particularly apparent from FIG. 7, the first running elements 58, 60, 62 and 64 are each configured as a roller, the running surface of which has openings 106, ventilation blades, which in the present exemplary embodiment are directed radially to the axis of rotation, formed by the journal 92, of the running elements 58, 60, 62 and 64, being arranged below the running surface. As the running elements 58, 60, 62 and 64 slide along the control cams 66 and 68, the rotation of the running elements 58, 60, 62 and 64 caused by the ventilation blades 108 produces a ventilation effect which, via the recesses 90 and 94 in the pistons 30, 32, 34, 36, causes the pistons 30, 32, 34, 36 to be flooded with air and thus to be cooled.

The pistons 30, 32, 34, 36 are also mounted to slide in the housing 12 in a piston cage 110 which revolves about the axis of rotation 38 in conjunction with the pistons 30, 32, 34, 36 and is shown in FIG. 5 together with the pistons 30, 32, 34, 36, but without the housing 12. In the piston cage 110, the pistons 30, 32, 34, 36 are prevented from turning or tilting, for example by means of tongue-and-groove connections (not shown).

The piston cage 110 has a first main bearing portion 112 containing a bore 114, the pistons 34 and 36 being mounted to slide in said bore. Together with the end surfaces 50 and 52, the bore 114 delimits the working chamber 56.

The piston cage 110 accordingly has a second main bearing portion 116 also having a bore 118 in which the pistons 30 and 32 are mounted to slide and which delimits the working chamber 54 together with the end surfaces 46 and 48 of the pistons 30 and 32. Owing to the arrangement, offset by 90°, of the pistons 30 and 32 relative to the pistons 34 and 36, the bores 114 and 116 are also configured perpendicularly to each other in the piston cage 110.

The piston cage 110 is mounted in the housing 12 via the main bearing portions 112 and 116 so as to be able to rotate about the axis of rotation 38 by means of bearings 120 and 122.

The piston cage 110 serves furthermore to transmit the revolving movement of the pistons 30, 32, 34, 36 and of the piston cage 110 about the axis of rotation 38 from or to a drive/output shaft 124. For this purpose, the piston cage 110 is provided at its ends with in each case a set of outer teeth 126 and 128, of which at least one set, in the exemplary embodiment shown the set of outer teeth 128, meshes with a gearwheel 130 which is rigidly connected to the output shaft 124. The output shaft 124 is, in the case of the oscillating piston engine 10, accordingly arranged on the axis of rotation 38 not coaxially, but rather extra-axially.

The mode of operation of the oscillating piston engine 10 will be described briefly hereinafter.

Starting from the TDC position shown in FIG. 3 of the pistons 30, 32, 34, 36, the pistons 30 and 32 or 34 and 36 pivot into the BDC position shown in FIG. 2, the pistons 30, 32, 34, 36 revolving in this case through 90° about the axis of rotation 38. The pivoting-apart of the pistons 30 and 32 or the pistons 34 and 36 is imparted by the running of the running elements 58, 60, 62 and 64 on the control cams 66 and 68, and thus assisted by the return means 78, 80, 82 and 84 which ensure that the pistons 30 and 32 or 34 and 36 pivot apart uniformly, without interruption and without braking and in particular without losing the contact of the running elements 58, 60, 62 and 64 with the control cams 66 and 68.

After further revolving of the pistons 30, 32, 34, 36 through 900 about the axis of rotation 38, the pistons 30, 32, 34, 36 pivot from the BDC position back to the TDC position, etc. As the pistons 30 and 32 or 34 and 36 pivot apart from each other from the TDC position to the BDC position, the drawing-in working stroke takes place for example in the working chamber 54 and the expanding working stroke in the working chamber 56 after ignition of the fuel/air mixture. As the pistons 30 and 32 or 34 and 36 subsequently pivot toward each other, the compressing working stroke then takes place in the working chamber 54 and the expelling working stroke in the working chamber 56, etc. A respective working (expanding) working stroke takes place in each working chamber 54 and 56 over a full rotation of the pistons 30, 32, 34, 36 about the axis of rotation 38.

Also arranged in the housing lid 26 are an admission connecting piece 132, which in the present exemplary embodiment is combined with an injection nozzle 134, for admitting a fuel/air mixture into the working chamber 54, a discharge connecting piece 136 for discharging combusted fuel/air mixture from the working chamber 54, and a spark plug 138. The exchange of gas into and from the working chamber 54 thus takes place on the end face 22 of the housing 12. A gas exchange opening 139, which controls the required exchange of gas, is provided for this purpose in the piston cage 110.

In addition to the injection nozzle and spark plug for the working chamber 56, corresponding gas exchange openings are associated with the end face 24, the arrangement being offset relative to the arrangement on the end face 22 through 1800 with respect to the axis of rotation 38. The end surfaces of the pistons 30, 32, 34, 36 have in their respective region facing the end face of the piston cage 110 a trough-like depression such as is denoted by reference numerals 140 and 142 for the pistons 30 and 32. The trough-like depressions 140 and 142, which are accordingly also provided on the pistons 34 and 36, cause a finite volume of the working chamber 54 still to remain in the TDC position of the pistons 30 and 32, as a result of which the pistons 30 and 32 are pressed apart from each other with optimum leverage on ignition of the fuel/air mixture which has just been compressed in the working chamber 54. According to FIG. 3, the pistons 30 and 32 each have associated with them, remote from the working chamber 54, backward chambers 144 and 146 respectively, the volume of which decreases in size when the working chamber 54 increases in size, and vice versa. The chambers 144 and 146 can be used as admission pressure chambers for precompressing combustion air as the pistons 30 and 32 pivot apart from each other, wherein in the BDC position of the pistons 30 and 32 the precompressed combustion air can then be injected into the pistons 30 and 32 via a valve arrangement (not shown) and, through said pistons, into the working chamber 54. Comparable backward chambers or admission pressure chambers can be provided accordingly for the pistons 34 and 36.

The chambers 144 and 146 can however also serve simply as cooling spaces for air cooling of the pistons 30 and 32. Such air cooling will be described hereinafter with reference to FIGS. 1 and 10.

According to FIG. 1, an air inlet 150 and a corresponding air outlet 152 are present on the housing 12, wherein cooling air for cooling the interior of the housing 12, in particular the piston back spaces, can be supplied via the air inlet 150 and discharged again via the air outlet 152. The air inlet 150 and the air outlet 152 are connected to an air cooling circuit 154 having an air cooler 156, an air filter 158, a circulation line 160 and a cooling air fan 162. The air cooler 156 is furthermore provided with a cooling fan 164. The cooling air fan 162 ensures that the cooling air circulates appropriately through the oscillating piston engine 10.

Alternatively or additionally to the above-described return means 78, 80, 82 and 84 for the pistons 30, 32, 34, 36, which are provided as second running elements in addition to the first running elements 58, 60, 62 and 64, the return means can also have a negative pressure source 166 which applies to the backs of the pistons (chambers 144, 146 of the pistons 30 and 32 and the corresponding piston back spaces of the pistons 34 and 36), i.e. the sides of the pistons 30, 32, 34, 36 that are remote from the working chambers 54 and 56, a negative pressure which withdraws the pistons 30, 32, 34, 36 from the TDC position to the BDC position or assists the return thereof to the BDC position, so that the first running elements 58, 60, 62 and 64 are guided at all times with contact on the control cams 66 and 68.

Figure 10:
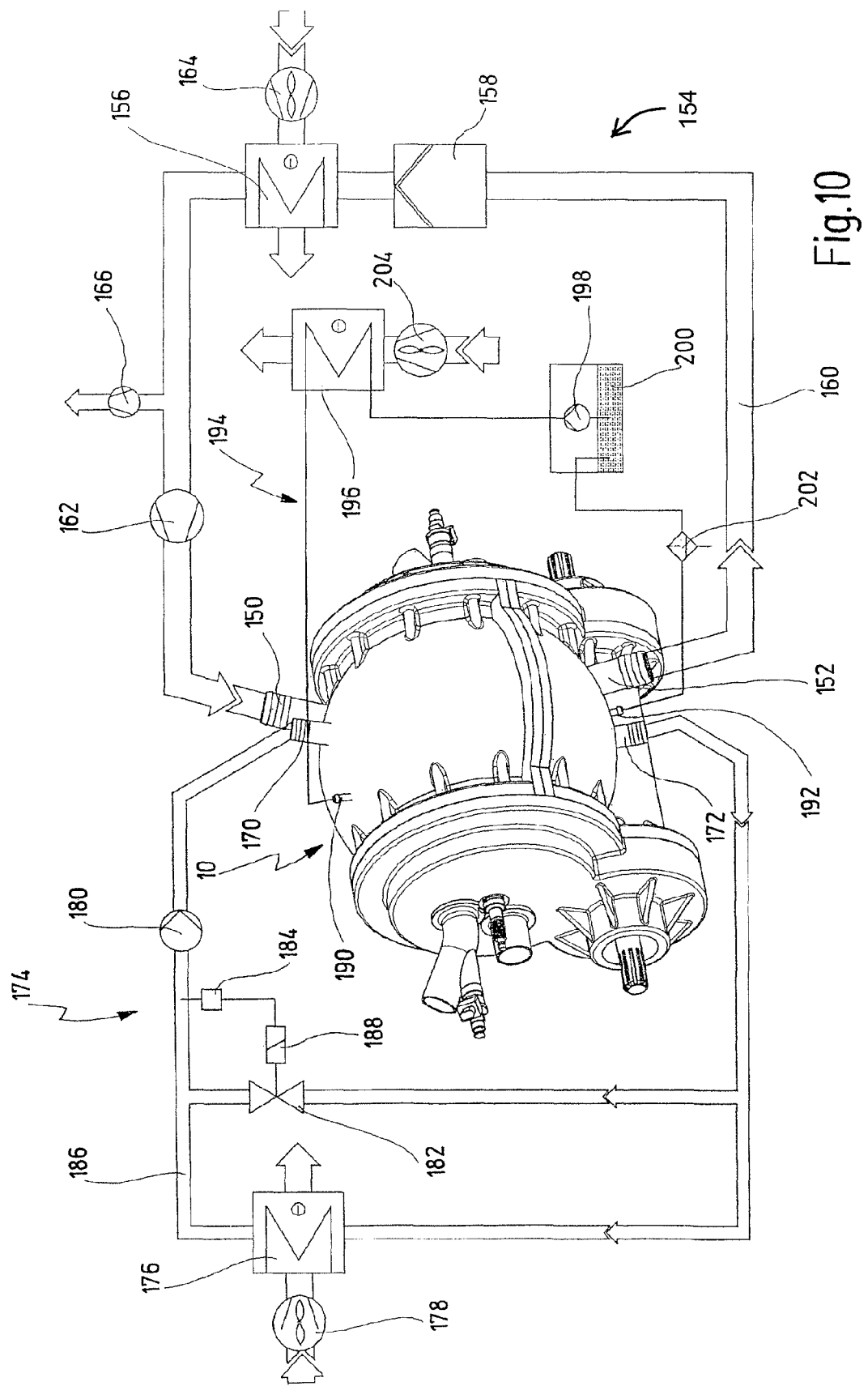
FIG. 10 shows the oscillating piston engine in FIG. 1 to 4 in a block diagram illustrating cooling and lubricating circuits for the oscillating piston engine.

The negative pressure source 166 is in the exemplary embodiment according to FIG. 10 now advantageously integrated into the cooling air circuit 154. During operation of the oscillating piston engine 10, the negative pressure source 166, which can be formed as a fan, generates in the respective piston back space a constant, stable negative pressure which can be a value in the range of from 1,000-2,000 kp/m$^2$. At such a negative pressure, which may also be referred to as a slight vacuum, a pressure of from 10-20 kp/m$^2$ is set for a surface area of 1 dm$^2$. At a diameter of the pistons 30, 32, 34, 36 of approximately 90 mm, representing a surface area of 0.635 dm$^2$, an effective suction pressure of from 6.35 kp/m$^2$ to 12.70 kp/m$^2$ is thus set. A suction pressure of this type is sufficient to hold the running elements 58, 60, 62 and 64 of the pistons 30, 32, 34, 36 at all times in a stable rolling contact with the respective control cam 66 or 68.

If an assisting return of the pistons 30, 32, 34, 36 by means of reduced pressure is not to be provided, the cooling air circuit is preferably a closed circuit.

According to FIG. 1, also present on the housing are a water inlet 170 and a water outlet 172 via which cooling water for cooling the housing 12 can be circulated even through said housing.

The water inlet 170 and the water outlet 172 are connected to a cooling water circuit 174 having a water cooler 176, with which a fan 178 is associated, and a water pump 180. The water circuit 174 also has a valve 182 and a temperature sensor 184, the temperature sensor 184 being connected to a main line 186 of the cooling water circuit 174 and controlling the valve 182 via a controller 188. This arrangement allows a substantially constant cooling water temperature to be set.

Finally, the oscillating piston engine 10 according to FIG. 1 has an oil inlet 190 and an oil outlet 192 in the housing 12. Oil for lubricating and cooling the rotating parts of the oscillating piston engine 10, in particular the piston cage 110 and the pistons 30, 32, 34, 36 as well as all running elements, is provided via the oil inlet 190.

According to FIG. 10, the oil inlet 190 and the oil outlet 192 are connected to an oil circuit 194 having an oil cooler 196, an oil pump 198, an oil pan 200, an oil filter 202 and a fan 204 for the oil cooler 196.

What is claimed is:

1. An oscillating piston engine, comprising:
    a housing,
    a first piston arranged in said housing, said first piston revolving in said housing about an axis of rotation which is fixed in relation to said housing, and revolving about said axis of rotation reciprocating pivoting movements about a pivot axis extending perpendicularly to said axis of rotation between a first end position and a second end position,
    a running element mounted to said first piston,
    a control cam arranged in said housing,
        wherein said running element runs, as said first piston revolves about said axis of rotation, along said control cam,
        wherein said control cam is configured to derive said pivoting movements of said first piston when said running element runs along said control cam, and
        wherein a negative-pressure source for generating a negative pressure applied to a back of said first piston is return means for assisting guiding of said first piston at least from said first end position to said second end position.

2. An oscillating piston engine, comprising:
    a housing,
    a first piston arranged in said housing, said first piston revolving in said housing about an axis of rotation which is fixed in relation to said housing, and revolving about said axis of rotation reciprocating pivoting movements about a pivot axis extending perpendicularly to said axis of rotation between a first end position and a second end position,
    a first running element mounted to said first piston,
    a first control cam arranged in said housing,
        wherein said first running element runs, as said first piston revolves about said axis of rotation, along said first control cam, and
        wherein said first control cam is configured to derive said pivoting movements of said first piston when said first running element runs along said first control cam,
    a second running element mounted to said first piston, and
    a second control cam arranged laterally adjacent to said first control cam in direction of said rotation axis,
        wherein said second running element runs along said second control cam when said first piston revolves about said axis of rotation,
        wherein said second running element is return means for assisting guiding said first piston at least from said first end position to said second end position, and
        wherein said first control cam and said second control cam are configured as cam grooves which extend substantially parallel to each other and are separated from each other by a web, said first running element and said second running element being guided on flanks of said cam grooves that are curved in opposite directions to each other.

3. The oscillating piston engine of claim 2, wherein said second control cam is configured such that said second running element, which runs along said second control cam, exerts a tensile force on said first piston in direction toward said second end position.

4. The oscillating piston engine of claim 2, wherein said second running element is a running roller.

5. The oscillating piston engine of claim 2, wherein said second running element is a sliding shoe.

6. The oscillating piston engine of claim 2, wherein said second running element is resiliently mounted on said first piston.

7. The oscillating piston engine of claim 2, wherein at least a second piston is arranged in said housing, which revolves together with said first piston about said axis of rotation and which pivots about a second pivot axis which does not run parallel to said pivot axis of said first piston, said at least one second piston having a third running element which runs along said second control cam for deriving reciprocating pivoting movements of said at least one second piston when revolving about said axis of rotation between a first pivot end position and a second pivot end position, and a fourth running element which runs along said first control cam, said forth running element being return means for assisting guiding said at least one second piston at least from said first pivot end position to said second pivot end position of said at least one second piston.

8. The oscillating piston engine of claim 2, wherein said first running element is configured as a roller, below a running surface of which ventilation blades are arranged.

* * * * *